United States Patent [19]
Kaminski et al.

[11] Patent Number: 5,273,433
[45] Date of Patent: Dec. 28, 1993

[54] AUDIO-VISUAL LANGUAGE TEACHING APPARATUS AND METHOD

[76] Inventors: Marek Kaminski, S. 101 W35367 Hwy. 99, Eagle, Wis. 53119; Alexander Lempicki, 303A Commonwealth Ave., Boston, Mass. 02115

[21] Appl. No.: 833,141
[22] Filed: Feb. 10, 1992
[51] Int. Cl.$^5$ .............................................. G09B 19/00
[52] U.S. Cl. ................................... 434/169; 434/156; 434/157
[58] Field of Search ............... 434/156, 157, 169, 112, 434/307, 308, 309, 310, 317

[56] References Cited

U.S. PATENT DOCUMENTS

| | | |
|---|---|---|
| 3,289,326 | 12/1966 | Bender . |
| 3,668,872 | 5/1972 | Powell et al. . |
| 3,793,471 | 2/1974 | Mason et al. . |
| 4,121,357 | 10/1978 | Hoffman et al. ................. 434/178 |
| 4,124,943 | 11/1978 | Mitchell et al. .................. 434/307 |
| 4,459,114 | 7/1984 | Barwick ............................ 434/307 |
| 4,879,210 | 11/1989 | Hamilton . |
| 5,002,491 | 3/1991 | Abrahamson et al. . |
| 5,010,495 | 4/1991 | Willetts . |

*Primary Examiner*—Richard J. Apley
*Assistant Examiner*—Glenn E. Richman
*Attorney, Agent, or Firm*—Ryan, Kees & Hohenfeldt

[57] ABSTRACT

An apparatus and method for teaching a language includes an audio visual medium for displaying a story on a screen in visual form accompanied by a sound track of said story in a language to be learned. A text is provided containing the story in written form with successive short segments of said story identified by means of sequential identifying indicia. The screen is provided with subtitles displaying each segment in written form in the language to be learned. Each of the subtitles is provided with sequential identifying indicia corresponding to those of the written text. Controls are provided to start, stop, and reverse the audio visual medium to permit a user to locate and repeat a particular segment repeatedly as desired.

7 Claims, No Drawings

AUDIO-VISUAL LANGUAGE TEACHING APPARATUS AND METHOD

FIELD OF THE INVENTION

The present invention relates to language teaching materials and procedures that utilize visual and audio information.

BACKGROUND

Various audio and visual materials have been utilized heretofore in an effort to supplement conventional language teaching methods which typically entail the use of a teacher who uses written materials. Recently, sophisticated materials such as microprocessors accessing random access memory devices in combination with speech synthesizers have been proposed for such purposes. See, for example, U.S. Pat. No. 4,579,533. Other devices that have sometimes been utilized are movies in which the audio portion is in a language to be learned and subtitles are provided in the speaker's native tongue. Such materials, however, do not assist the student in learning to think in the new language. Audio-visual materials have been heretofore available for use in teaching of signing to hearing impaired persons. See, for example, U.S. Pat. No. 4,879,210. The available materials, however, are not in a form adapted to teach a language to a person having a different native tongue.

Although various materials and devices have been heretofore available, a need has continued to exist for materials which permit a student to imitate the process by which a child learns language by associating sound with images and/or actions. It is a principal object of the present invention to provide such improved materials. An important related object is to provide such materials and processes which make language learning more efficient and shorten the length of time required to develop a command of a language. A related object is to provide such materials which will assist students who have a good command of the written language and who are unable to either speak the language or understand the spoken word to develop both of the latter skills.

A further object is to provide materials and processes which can be utilized both as a training aid for beginning or intermediate students to develop a rudimentary knowledge of a language but which also can be adapted for specific specialized uses for training such persons as newscasters, business people, engineers or doctors to develop a working knowledge of the new language as it relates to their professions. A still further object is to provide such materials which are intellectually stimulating and can be provided with a built in gauge of progress by the student. A still further object is to provide such materials such as are effective in teaching the student the meaning and use of idioms and slang expressions that are an important part of the new language.

In accordance with the invention, apparatus for teaching a language includes an audio visual medium for displaying a story on a screen in visual form accompanied by an audible sound track of said story in a language to be learned as well as by subtitles displaying each segment of the story in the written form also in the language to be learned. Each of the subtitles is provided with sequential identifying indicia corresponding to those of the written text. A text is provided containing a story in the written form with successive short segments of said story identified by means of sequential identifying indicia corresponding to those displayed on the screen. The text in the written form also contains explanations of idiomatic expressions of any other materials authors decide to include.

In a single track version subtitles are displayed simultaneously with the story. In a multitrack version they are recalled to the screen from one of the additional tracks separately or in combinations with remaining tracks(s). Means are provided to start, stop and reverse the audiovisual medium, as well as to display a desired combination of tracks. This permits the user to locate, display and repeat a particular segment or sequence repeatedly as desired.

DETAILED DESCRIPTION

In accordance with a preferred embodiment of the invention a monitoring screen such as that of a television set, video player such as a VCR and material such as a movie or other dramatic presentation recorded on a medium such as a videocassette are used in conjunction with the written text containing the narrative/spoken part of the recorded material. The text is divided into numbered segments which may be paragraphs, individual words, sentences or groups of sentences. When the videocassette is being played the visual images of the story and sound track can be observed and heard from a television receiver. The screen also contains subtitles corresponding to the displayed story as well as to the written text using the same indicia to indicate the same segments of the story. Thus utilizing a standard remote control for the VCR a student can start, stop and review a material repeatedly as well as refer to a written text until he masters it.

The indicia used to designate segments of the story may be numbers or letters or a combination of the two. Other combinations such as Roman numerals or italicized numerals may also be utilized as the author chooses.

In a further embodiment, split screen TV technology can be used combined with two or more synchronized VCRs with videocassettes containing original story, subtitles and/or idiom explanations. Those recordings are displayed separately or in any combination on the screen as needed. It is thus possible to both test a student's comprehension of the language and to provide the student, on demand, instantaneously, various forms of additional helpful information.

In yet a further embodiment subtitles can be recorded on vertical blanking intervals (currently applied in Closed Caption) and displaying on demand with a CC converter.

Instead of a television receiver and videocassette, it will be appreciated that other similar mediums may be used instead. For example, if desired, videodiscs can be used in place of a VCR and cassettes. Also, if desired, movie film and a projector can be employed. If desired, a microprocessor could also be utilized in which the segments brought up, for example, from an ROM are coordinated with the materials displayed on the monitor.

The present invention contemplates that the materials can be arranged to support different levels of learning. Firstly, it is readily adaptable to use at a beginners level where the goal is to acquire a limited vocabulary, some feeling for grammatical correctness and to enable the student to master the basics of pronunciation and understanding. To improve the attention span, it is contemplated that rather than using contrived conversations between unconvincing characters, instead, scenes from popular movies can be used for both children and adults. At the beginning level, after some previews of the material, the student is greatly assisted by trying to imitate the characters. This can be achieved by using the printed text and turning off the sound.

At the next, intermediate level, the learning steps of the same audio-visual material can be studied in succession. Step 1 could be a "straight" presentation of the audio-visual material. In other words, the text and subtitles provide an exact transcription of the dialogue, permitting the student to simultaneously listen and read as well as witnessing real life situations in which all of the phrases being studied are used. It is contemplated that all idiomatic expressions will be indicated by being provided in a different font, such italics, or underlined. By referring to the segment indicia on the screen, the student can refer to the text for a full explanation of the idiomatic expressions. Alternatively, the idiomatic expressions can be explained on a separate track which also may be displayed on the screen. These alternatives apply as well to materials appearing on the screen in written form only, for example, "deer X-ing", "X-mas sale" or "M.A.A.D". Such materials can be assigned an indicia and explained in the text or on the screen.

In the second learning step the student can be provided with the same movie without the subtitles but utilizing the page and verse numbers only. Being now familiar with the story he can test his level of understanding, and if needed, refer to the written text. Alternatively, subtitles can be recorded on a second track and displayed on demand. The student watches the material without subtitles and if needed recalls them from the second track. If that is not sufficient, the student can refer to yet another track for additional explanations.

A third level can then be utilized during which the active participation of the student is required. The same scenes can be shown with the same dialogue with the voice of one of the characters erased. The student will assume the role of the erased character. His text can be printed on the screen, but he will have to substitute the voice. In this manner, he can have a dialogue with his favorite movie star thereby enhancing his enjoyment of the learning materials.

At the third level a more specialized vocabulary can be provided for assimilation by the student. For example, the materials can include tapes of important newscasts which allow a student to be familiarized with news delivery and a potential newscaster to be provided with the proper lingo appropriate to the profession. In similar fashion, materials can be tailored for use by medical students, law students and in fact students intending to enter into any desired profession.

In accordance with a further embodiment of the invention more than one sound track can be provided so that the student can listen to the story on one sound track utilizing idiomatic expressions and then listen on a second sound track to the same story but given in more standardized non-idiomatic terms. In yet a further embodiment, it is possible to use a split screen in which one of the screens is used in conjunction with the story given in idiomatic terms and the other side of the split screen used to present the story in terms translated into standard language. The system will incorporate multi-track magnetic or digital recordings and means to switch between tracks or to display and of the tracks on screen windows on the monitor. Such means can take the form of specially designed apparatus or as a converter used in conjunction with existing audiovisual equipment.

It will be understood by those skilled in the art that while specific embodiments of the invention are presented for purposes of illustration, that these embodiments are not meant to be restrictive. Various modifications will be apparent without departing from the spirit of the invention as set forth in the appended claims.

What is claimed is:

1. Apparatus for teaching a language comprising
   an audio visual medium for displaying a story on a screen in visual form accompanied by audible sounds generated by a sound track of said story in a language to be learned, said medium including a screen and loudspeakers,
   a text corresponding to said audible sounds in written form with successive short segments of said text identified by means of sequential identifying indicia,
   said screen being provided with subtitles displaying in written form in the language to be learned a transcription of the word spoken in said sound track, said subtitles being provided with sequential identifying indicia corresponding to those of the written text, and,
   means to start, step, and reverse said audio visual medium to permit a user to locate and repeat a particular segment repeatedly as desired.

2. Apparatus according to claim 1 wherein said screen is a television monitor.

3. Apparatus according to claim 2 wherein said audio-visual materials are recorded on a videocassette.

4. Apparatus according to claim 1 wherein the story, subtitles, explanations of idioms and other explanatory materials are displayed, on demand, on the screen separately, simultaneously, sequentially, or in any chosen combination in order to test student's language comprehension and/or provide him instantaneously with any additional information.

5. Apparatus according to claim 1 wherein said story is also depicted with said indicia, but without said subtitles.

6. Apparatus according to claim 1 wherein idiomatic materials are italicized, highlighted or underscored.

7. A method for teaching a language comprising
   providing an audio visual medium including a screen, a loudspeaker, a medium containing a recorded story, and means for playing a visual enactment of the story from the recorded medium to the screen and an sound track for producing audible sounds in the loudspeaker corresponding to the story,
   displaying said enactment on a screen in visual form accompanied by audible sounds generated by said sound track of said story in a language to be learned,
   providing a written text containing said story in written form with successive short segments of said story identified by means of sequential identifying indicia,
   providing on the visual medium on said screen subtitles displaying said audible sounds in written form in the language to be learned, said subtitles being provided with sequential identifying indicia corresponding to those of the written text.

* * * * *

UNITED STATES PATENT AND TRADEMARK OFFICE
CERTIFICATE OF CORRECTION

PATENT NO. : 5,273,433
DATED : December 28, 1993
INVENTOR(S) : Marek Kaminski

It is certified that error appears in the above-indentified patent and that said Letters Patent is hereby corrected as shown below:

Column 4, Line 24 - "word" should be "words".

Column 4, Line 28 - "step" should be "stop".

Signed and Sealed this

Twenty-fourth Day of May, 1994

Attest:

BRUCE LEHMAN

Attesting Officer

Commissioner of Patents and Trademarks